United States Patent [19]

Pio-di-Savoia et al.

[11] Patent Number: 5,357,452
[45] Date of Patent: Oct. 18, 1994

[54] AUTOMATIC GENERATION OF AUTO-CHECKING TESTING FUNCTIONS

[75] Inventors: Luigi A. Pio-di-Savoia; Jonathan Gibbons, both of Mountain View; James D. Halpern, Belmont; Roger Hayes, San Francisco, all of Calif.

[73] Assignee: Sun Microsystems, Inc., Mountain View, Calif.

[21] Appl. No.: 906,697

[22] Filed: Jun. 30, 1992

[51] Int. Cl.$^5$ .............................................. G06F 15/20
[52] U.S. Cl. ........................................ 364/579; 371/19
[58] Field of Search ................. 364/579, 580; 371/19, 371/27

[56] References Cited

U.S. PATENT DOCUMENTS

| | | | |
|---|---|---|---|
| 4,550,406 | 10/1985 | Neal | 371/27 X |
| 4,595,981 | 6/1986 | Leung | 371/19 |
| 4,729,096 | 3/1988 | Larson | 395/700 |
| 5,159,600 | 10/1992 | Chintapalli et al. | 371/27 |

OTHER PUBLICATIONS

Robert Dunn, Software Defect Removal, McGraw Hill, 1984, pp. 232–251.
Glenford Myers, The Art of Software Testing, Wiley–Interscience, 1979 pp. 4–16, 44–55, 147–164.
Randall Neff, ADA/ANNA Specification Analysis, Technical Report: CSL-TR-89-406, Computer Systems Laboratory, Dept. of Electrical Engineering & Computer Science, Stanford U., Stanford, Calif. 94305–4055.
Denise M. Woit, An Analysis of Black Box Testing Techniques, May 1992, CSL Report No. 245, Telecommunications Research Institute of Ontario (TRIO), McMaster U., Hamilton, Ontario, L8S 4K1.

Primary Examiner—Edward R. Cosimano
Attorney, Agent, or Firm—Blakely Sokoloff Taylor & Zafman

[57] ABSTRACT

An auto-checking testing funtion generator is provided for generating auto-checking testing functions for procedures of a software interface from a formal specification specifying the procedures. The procedures are specified with procedure semantic expressions identifying the procedures and specifying their arguments, returning results, raisable exceptions, exceptional and normal terminations. Each exception or normal termination specifies the correct post-execution exception or normal termination state for the procedure given a particular pre-execution state. The procedure semantic expressions are boolean expressions constructed using comparison and boolean operators, calls to the procedure, auxiliary and special functions. The auxiliary functions are user supplied, and the special functions are supplied by the auto-checking testing funtion generator. An auto-checking testing funtion is generated for each procedure. Each generated auto-checking testing funtion has the same execution flow for determining whether the procedure behaved properly or improperly when executed. The execution flow makes the determination by evaluating the specified exceptional and normal terminations.

20 Claims, 25 Drawing Sheets

```
interface am size:enum(negative,zero,small,large)   57' parameter acct=account                                    55a'
         attr bal:enum(neg,zero,tiny,huge,enorm)
         attr typ:enum(economy, standard, gold)
end
                   55b'
parameter amt=amount
         attrsz:size
end
                                                          55c'
parameter bank=am
         attr type:enum(commerce,snal,consumer,cu)
end test bank.create_account(amt,acct)   53a'
test acct.withdraw(amt)   53b'
test acct.deposit(amt)
                      53c'
```

```
#include "contract_test.h"
#include "am.h"
#include "am_aux.h"

BitVec test_am_create_account(am_fp obj, int opening_balance, am_account_fp &result) raises
    ExceptionallyFault,MissingException,UnexpectedException
BitVec test_am_account_deposit(am_account_fp obj,int deposit_amount) raises ExceptionallyFault,
    MissingException,UnexpectedException
BitVec test_am_account_withdraw(am_account_fp obj, int with_amount) raisees ExceptionallyFault,
    MissingException,UnexpectedException
BitVec test_am_account_get_balance(am_account_fp obj, int &result) raises UnexpectedException,
    ExceptionInCondition
```

```
%types 3
amount int32 int builtin
am am.am am_fp object
account am.account am_account_fp object %inherits 1
generic_object:"misc.generic_object"

%methods 4
am.create_account "am_test.h" test_am_create_account <default> (copy inst32) produce am.acc
account.deposit "am_test.h" tst_am_account_deposit <default> (copy int32) produce <void>
account.withdraw "am_test.h" test_am_account_withdraw <default> (copy int32) produce <void>
account.get_balance "am_test.h" test_am_account_get_balance <default> () produce int32
```

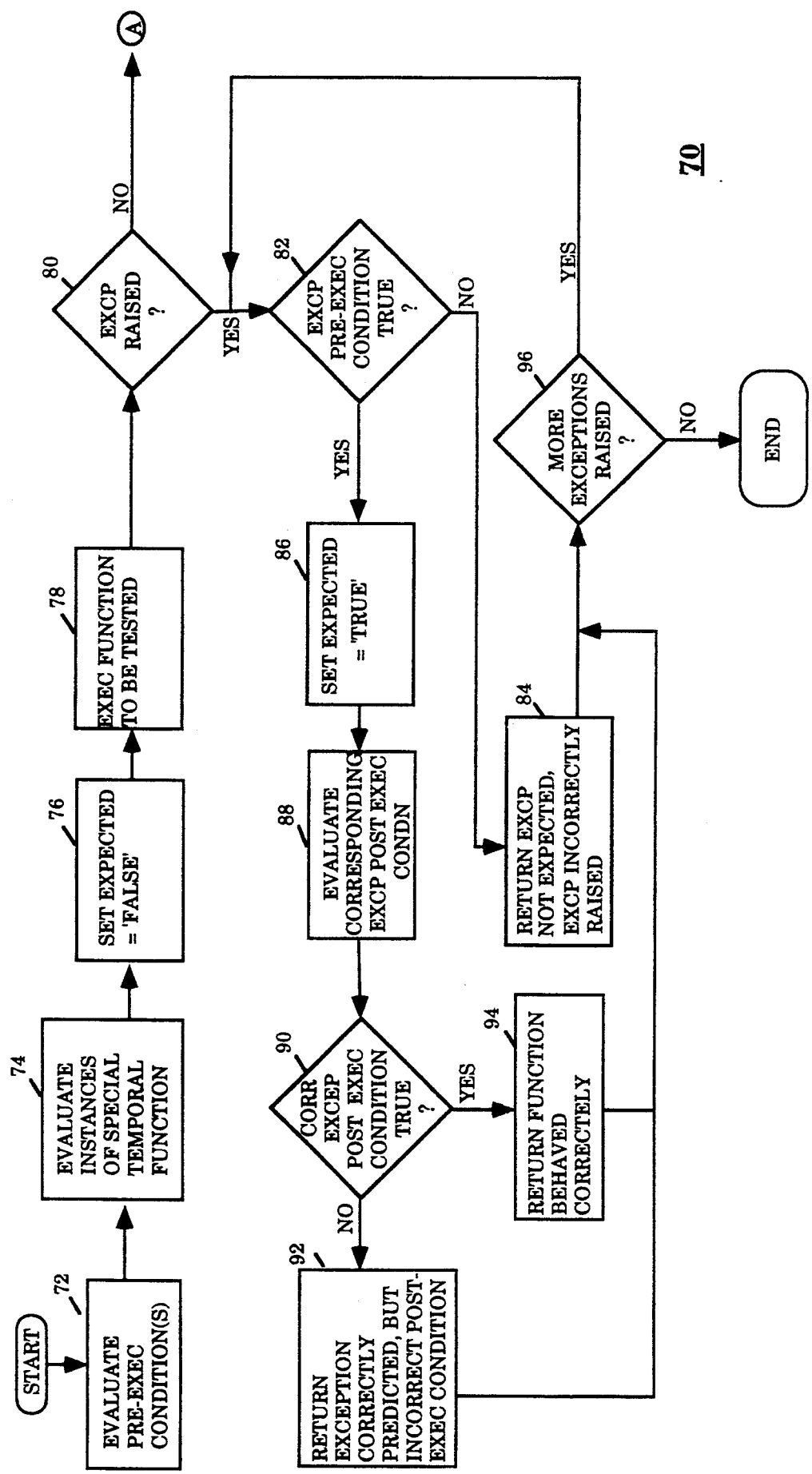
FIGURE 7A (CONTINUED IN FIGURE 7B)

(continuation of Figure 7a)

```
#include "am_test.h"
static void run_test_am_create_account()                    91a
{
    NotePad precond("Input");
    AttrStat*subfun=AttrStat::make("am_create_account",verbosity);

int totct = attr_bank_type::ct() *
        attr_size::ct() *
        1;
        subfun->predict(totct);
        subfun->begin();
for (int i0 = 0; i0 < attr_bank_type::ct(); i0++) {          92a
attr_bank_type t0(i0);
for (int il = 0; il < attr_size::ct(); i1++) {
attr_size s0(i1);
    ct++;
    precond.reset();                                          86
    subfun->start(ct);

am_fp b0;
// notate attribute values
precond.note("type",t0.print());
if(!provide_bank(b0,t0)) {
    subfun->skip(precond);
    continue;
}                                                             93a int a();
//notate attribute values
precond.note("sz",s0.print());
if(!provide_amt(a0,s0)) {
    subfun->skip(precond);
    continue;
}
```

```
// produced by test proc          ⎫  94a
am_account_fp r0                  ⎭

//loopcore
    subfun->run(precond);
    try {
        test_start(ct);                                    ⎫ 95a
        BitVecPair res = test_am_create_account(b0,a0,r0); ⎬
        subfun->ok(res);                                   ⎭
    } except ex {
        MissingException {
            subfun->me(ex.before, ex.after);
        }
    UnexpectedException {
            subfun->ue(ex.before, ex.after, ex.raised);
        }
    ExceptionallyFault {                                          ⎫ 96a
            subfun->ef(ex.before, ex.after, ex.raised, ex.pad);   ⎬
        }
    NormallyFault {
            subfun->nf(ex.before, ex.after, ex.pad);
        }
    ExceptionInCondition {
            subfun->nf(ex.before, ex.after, ex.pad);
        {
    default {
            panic("bad exception in test driver");
        }
//value produced by tested method (storage leak?) : r0
    relinquish_amt(a0, s0); ⎫
    relinquish_bank(b0,t0); ⎬ 97a
}}
    //statistics reporting
    subfun->end();
    gfailct += subfun->failcount(); ⎫ 98a
    delete subfun;                  ⎭
}
```

*FIGURE 8b*

```
//loop core
subfun->run(precond);
try {
        test_start(ct);                                              95b
        BitVecPair res = test_am_account_deposit(a0, a1);
        subfun->ok(res);
} except ex {
        MissingException {
                subfun->me(ex.before, ex.after);                     96b
        }
UnexpectedException {
        subfun->ue(ex.before, ex.after, ex.raised);
}
ExceptionallyFault {
        subfun->ef(ex.before, ex.after, ex.raised, ex.pad);          88
}
NormallyFault {
        subfun->nf(ex.before, ex.after, ex.pad);
}
ExceptionInCondition {
        subfun->eic(ex.before, ex.after, ex.raised,
                ex.state, ex.pad);
{
default {
        panic("bad exception in test driver");
}
relinquish_amt(a1, s0);            97b
relinquish_acct(a0, b0, t0);
}}}
        // statistics reporting                98b
        subfun->end();
        gfailct += subfun->failcount();
        delete subfun;
}
```

FIGURE 8d

```
#include "am_test.h"
static void run_test_am_account_deposit()            —91c
{
       NotePad precond("Input");
       AttrStat* subfun = AttrStat::make("am_account_deposit",verbosity);

int totct =
              attr_acct_bal::ct() * attr_acct_typ::ct() *
              attr_size::ct() * 1;
              subfun->predict(totct);
              subfun->begin();
for (int i0 = 0; i0 < attr_acct_bal::ct(); i0++) {
attr_acct_bal b0(i0);
for (int i1 = 0; i0 < attr_acct_typ:ct(); i1++) {         92c
attr_acct_typ t0 (i1);
for (int i2 = 0; i2 < attr_size::ct(); i2++) {
attr_size s0(i2);
       ct++;
       precond.reset();
       subfun->start(ct);

am_account_fp a0;
// notate attribute values
precond.note("bal", b0.print());
precond.note("type", t0.print ());
if (!provide_acct(a0, b0, t0)) {
       subfun->skip(precond);
       continue;
}                                                        93c int a1;
//notate attribute values
precond.note("sz", s0.print());
if (!provide_amt(a1, s0)) {
       subfun->skip(precond);
       continue;
}
```

```
//loop core                                              90
subfun->run(precond);
try {
    test_start(ct);                                      ⎫
    BitVecPair res = tst_am_account_deposit(a0, a1);     ⎬ 95c
    subfun->ok(res);                                     ⎭
} except ex {
    MissingException {
        subfun->me(ex.before, ex.after);
    }
    UnexpectedException {
        subfun->ue(ex.before, ex.after, ex.raised);
    }
        ExceptionallyFault {
        subfun->ef(ex.before, ex.after, ex.raised, ex.pad);
    }
    NormallyFault {                                                      96c
        subfun->nf(ex.before, ex.after, ex.pad);
    }
    ExceptionInCondition {
        subfun->eic(ex.before, ex.after, ex.raised, ex.state, ex.pad)
    {
    default {
        panic("bad exception in test driver");
    }
}
ıquish_amt(a1, s0);          ⎫ 97c
ıquish_acct(a0, b0, t0);     ⎭

// statistics reporting       ⎫
subfun->end();                ⎪
gfailct += subfun->failcount(); ⎬ 98c
delete subfun;                ⎭
```

*FIGURE 8f*

```
main(int ac, char **av) {
    Flag f_am_create_account("am_create_account, "test");
    Flag f_am_account_withdraw("am_account_withdraw", "test");
    Flag f_am_account_deposit("am_create_account","test");

attr_init(ac,av);

if(ac < 2 | | f_help) {
        Flag::list(cout,"am.attr");
        exit(0);
    }
    if(f_all | | f_am_create_account) {
        run_test_am_create_account();
    }
    if (f_all | | f_am_account_withdraw) {
        run_test_am_account_withdraw();
    }
    if(f_all | | f_am_account_deposit) {
        run_test_am_account_deposit();
    }
    report_result(gfailct == 0);
    exit(gfailct);
}
```

```
class attr_acct_typ : public attr {
public:
     // this enumeration can be convenient in provide functions.
     enum attr_acct_typ_Kind {economy, standard, gold};
     char*print();
     int   val;
          attr_acct_typ(int i);
     static int  ct();
};
```
⎫ 104c

```
class attr_bank_type : public attr {
public:
     // this enumeration can be convenient in provide functions.
     enum attr_bank_type_Kind {commerce, sn1, consumer, cu};
     char*print();
     int   val;
          attr_bank_type(int i);
     static int  ct();
};
```
⎫ 104d

```
// the following must be defined by the user
bool provide_acct (am_account_fp &acct_var, attr_acct_bal b0,
     attr_acct_typ t0);
void relinquish_acct (am_account_fp &acct_var, attr_acct_bal b0,
     attr_acct_typ t0);
```
⎫ 106a

```
bool provide_amt (int &amt_var, attr_size s0);
void relinquish_amt (int &amt_var, attr_size s0);
```
⎫ 106b

```
bool provide_bank (am_fp &bank_var, attr_bank_type t1);
void relinquish_bank (am_fp &bank_var, attr_bank_type t1);
```
⎫ 106c

*FIGURE 9b*

```
#include "am_attr.h"
char* attr_bool::print() {
    switch (val) {
        case False: return "False";
        case True:      return "True";
        default: panic("unknown attr val");
            return "????";
    }
}
attr_bool::attr_bool(int i) {
    if (i < 0 || i > ct ()) {
        panic ("bad value to attr constructor");
    }
    val = i;
}
int attr_bool::ct () {
    return 2;
} char* attr_size::print () {
    switch (val) {
        case negative:  return "negative";
        case zero:      return "zero";
        case small: return "small";
        case large: return "large";
        default: panic ("unknown attr val");
            return "????";
    }
}
attr_size::attr_size (int i) {
    if (i <0 || i > ct()) {
        panic ("bad value to attr constructor");
    }
    val = i int attr_size::ct () {
    return 4;
}
```

```
char* attr_acct_bal::print () {
    switch (val) {
        case neg:       return "neg";
        case zero:      return "zero";
        case tiny:      return "tiny";
        case huge:      return "huge";
        case enorm:     return "enorm";
        default: panic ("unknown attr val");
                return "????";
    }
}
attr_acct_bal::attr_acct_bal(int i) {
    if (i < 0 | | i > ct ()) {
        panic("bad value to attr constructor")
    }
    val = i;
}
int attr_acct_bal::ct() {
    return 5;
}
```

```
char* attr_acct_typ::print() {
    switch (val) {
        case economy:       return "economy";
        case standard:      return "standard";
        case gold:          return "gold";
        default: panic ("unknown attr val");
                    return "????";
    }
}
attr_acct_typ::attr_acct_typ (int i) {
    if (i < 0 || i > ct ()) {
        panic ("bad value to attr constructor");
    }
    val = i;
}
int attr_acct_typ::ct() {
    return 3;
} char* attr_bank_type::print() {
    switch (val) {
        case commerce:      return "commerce";
        case snl:           return "snl";
        case consumer:      return "consumer";
        case cu:            return "cu";
        default: panic ("unknown attr val");
                    return "????";
    }
}
attr_bank_type::attr_bank_type(int i) {
    if (i < 0 || i > ct ()) {
        panic ("bad value to attr constructor");
    }
    val = i;
}
int attr_bank_type::ct() {
    return 4;
}
```

Braces group: 114 (print function for attr_acct_typ), 108c (entire attr_acct_typ block), 116 (attr_bank_type print function).

FIGURE 10c

```
#include "am.h"
#include "am_attr.h"

const char *service_name = "simple_account_manager";

bool
provide_acct (am_account_fp &a, attr_acct_bal bal) { am_fp acct_mgr = EZLOOKUP (*village_namer, service_name, am);

am_amount opening_balance;
    switch (bal.val) {
            case attr_acct_bal::neg:
                    opening_balance = -10;
                    break;
            case attr_acct_bal:: zero:
                    opening_balance = 0;
                    break;
            case attr_acct_bal::tiny:
                    opening_balance = 100;
                    break;
            case attr_acct_bal::huge:
                    opening_balance = 1000;
                    break;
            case attr_acct_bal::enorm:
                    opening_balance =10000;
                    break;

default:
                    // should not get here
                    cout << "bad value for attr_acct_bal\n";
                    return FALSE;
    }
    try {
    a = acct_ mgr->create_account(opening_balance);
    } except ex {
    am_negative_amount {
    cout << "create_account raised am. negative_amount\n";
        return FALSE;
    }
    contract_ fault {
    cout <<
        form("create_account raised contract_failure (#%x)\n", ex.code);
            return FALSE;
    }
    default {
        cout << "create_account raised unknown exception";
        return FALSE;
    }
  }
  return TRUE;
}
```

```
void
relinquish_acct(am_account_fp &a, attr_acct_bal bal) {
  a->consume();
```

124A

```
bool
provide_amt (am_amount &a, attr_size size) { switch(size.val) {
                case attr_size::negative:
                        a = -10;
                        break;
                case attr_size::zero:
                        a = 0;
                        break;
                case attr_size::small:                  122b
                        a = 100;
                        break;
                case attr_size::large:
                        a = 1000;
                        break;                          120b
                default:
                        // should not get here
                        cout << "bad value for attr_size_size\n'
                        return FALSE;
        }
         return TRUE;
} void
relinquish_amt (am_amount &a, attr_size s) {     } 124b
   // no work to do
} bool
provide_bank (am_fp &a, attr_bank_type t0) {
  if (t0.val -- attr_bank_type::consumer)       {
     am_fp acct_mgr = EZLOOKUP (*village_namer,
service_name, am);                                    122c
     a = acct_mgr;
     return TRUE;
  } else {
     return FALSE;
  }
}
void
relinquish_bank (am_fp &bank_var, attr_bank_type t0) {
   // make bank_var go away, the test driver is done with it   } 124c
   bank_var->consumer();
}
```

FIGURE 11b

```
#include "am.h"
#include "am_aux.h"

bool am_owns (am_fp obj, am_account_fp act) {
    // return true if 'obj' owns 'act'
    am_fp other = am_account_branch(act);
    return (other == obj) ;
}
```
} 144

142

```
#include "am_impl.h"

am_fp am_account_branch(am_account_fp obj) {
    // find the bank that holds this account
    am_fp branch;

am_account_impl act_impl (obj_fp);   // create local object from
    remote branch = act_impl ->bank();    // invoke local operation
    return branch;
}
```
} 146

FIGURE 12A

```
#pragma once
#pragma interface
#include "am_srvr.h"
```

150 {
```
class am_impl:
    public am_srvr                          148
{
public:
    // interface "am", object am ...
    virtual am_account_fp create_account
        (am_amount opening_balance) raises am_negative_amount;
};
```

```
class am_account_impl:
    public am_account_srvr
{
```

152 {
```
public:
    am_account_impl (am_fp branch, am_amount opening_balance);
    am_account_impl(am_account_fp rem);
                    // convert externalized object back to local // interface "am", object account ...
    virtual void deposit (am_amount deposit_amount)
        raises am_negative_amount;
    virtual void withdraw(am_amount with_amount) raises
        am_negative_amount,
am_insufficient_funds;
    virtual am_amount get_balance();
    virtual am_fp bank() { return institute; };
private:
    int balance;
    am_fp institute;
};
```

FIGURE 12B

AUTOMATIC GENERATION OF AUTO-CHECKING TESTING FUNCTIONS

RELATED APPLICATION

This application is related to a co-pending U.S. patent application Ser. No. 07/906,692, filed concurrently, entitled Automatic Generation of Test Drivers, which is also assigned to the assignee of the present invention, Sun Microsystems, Inc. of Mountain View, Calif.

BACKGROUND OF THE INVENTION

1. Field of the Invention

The present invention relates to the field of software testing. More specifically, the present invention relates to automatic generation of auauto-checking test functions.

2. Art Background

Traditionally, software testing was done on an ad-hoc basis. As the complexity of software increases with increasing function being offered, various approaches, techniques and tools have been developed to provide a more structured or disciplined approach to software testing. From a process perspective, typically a phase approach is used to divide software testing into different stages, such as requirement testing, design testing, unit testing, function testing, and system testing. For each stage, different testing techniques, such as boundary value testing and sampling, are applied to improve test coverages. Additionally, various testing tools, such as test case generators and simulators, are developed to improve testing efficiency.

Traditionally, software specification and design were also done on an informal basis. Similarly, as the complexity of software increases with increasing function being offered, various techniques and tools have been developed to provide a more formal approach to software specification and design. Particular examples of formal design techniques include top down design and data flow analysis. Particular examples of formal design tools include formal specification and design languages and various Computer Aided Software Engineering (CASE) tools.

The advent of formal specification and design languages offers a new opportunity for further imposing structure and discipline to software testing. The formal specifications can be submitted to machine based analysis. If the proper behavior of a software interface can be adequately described by its formal specification, then test functions can be automatically and systematically generated for the software interface from the formal specification. Furthermore, the generated test functions can be auto-checking. An auto-checking test function is a function that can invoke and execute a procedure to be tested and knows enough about the procedure to be able to determine whether the procedure behaved properly or improperly when the procedure was tested.

Thus, it is desirable to be able to formally specify the proper behavior of a software interface, automatically and systematically generate test functions for the software interface from its formal specification. It is further desirable that these generated test functions are auto-checking.

As will be disclosed, the present invention provides methods and apparatus for formally specifying software interfaces, automatically and systematically generating auto-checking test functions from these formal specifications, which achieves the desired results described above.

SUMMARY OF THE INVENTION

Methods and apparatus for formally specifying software interfaces, automatically and systematically generating auto-checking test functions from these formal specifications are disclosed. The methods and apparatus have particular application to automated software testing, in particular, software interfaces having a number of procedures. The procedures may be implemented in any of the well known programming languages, such as C, employing any of the well known programming methodologies, such as objected oriented programming.

An auto-checking test function generator is provided for receiving formal specifications of software interfaces as inputs, and in response, generating auto-checking test functions. Each formal specification specifies the procedures of a software interface, and each procedure's pre-execution conditions and the corresponding post-execution conditions. The auto-checking test function generator generates an auto-checking test function for each procedure specified. In some embodiments, depending on the programming languages used for the auto-checking test functions, and/or the programming methodologies employed by the software interfaces, the auto-checking test function generator also generates auto-checking test function include files, and auto-checking test function definition files.

Each formal specification comprises a number of procedure semantic expressions, each specifying a procedure of the software interface, and the procedure's pre-execution conditions and the corresponding post-execution conditions. A pre-execution condition specifies one of the potential pre-execution state for the procedure, and the corresponding post-execution condition specifies the post execution state of the procedure if the procedure executes correctly given the pre-execution state.

In the presently preferred embodiment, each procedure semantic expression is a boolean expression comprising a call to the procedure, zero or more returning values, zero or more raisable exceptions, zero or more exception termination pre-execution and post-execution condition pairs, and at least one normal termination pre-execution and post-execution condition pair. Each boolean expression is constructed using comparison operators, boolean operators, auxiliary and special functions, references to the arguments and results of the procedure, auxiliary and special functions. The auxiliary functions are user supplied functions. The special functions comprise a special boolean function and a special temporal function. The special boolean function has an exception condition as its argument, and returns a true value when the procedure raises a particular exception during execution. The special temporal function has variable names as its arguments, and returns the variables' pre-execution values after the procedure was executed.

Additionally, interface semantic specifications specifying object oriented interfaces may also specify object inheritance characteristics. Its procedural semantic expressions may also comprise locally defined objects. The locally defined objects may be specified by object semantic expressions, preferably in like manner, as the procedure semantic expressions.

In one embodiment, the auto-checking test function generator comprises a parser, an intermediate representation builder, a semantic analyzer and a code generator. The parser receives the interface semantic specifications as inputs, and tokenizes the boolean expressions. The intermediate representation builder receives the tokenized boolean expressions as inputs, and generates intermediate representations for these boolean expressions. The semantic analyzer receives the intermediate representations as inputs, analyzes the semantics, and restructures the intermediate representations for output generation. The code generator receives the restructured intermediate representations as inputs, and generates executable code for the auto-checking test functions.

In a related embodiment, the parser parses and tokenizes the boolean expressions based on a YACC grammar. The intermediate representation builder builds an annotated syntax tree. The semantic analyzer analyzes and restructures the annotated syntax tree into a second syntax tree. The code generator generates the executable code of the auto-checking test functions using the second syntax tree.

In a further related embodiment for object oriented software interfaces, the intermediate representation builder uses C++ objects to represent the various grammar constructs in the annotated syntax tree. Except for function bodies, the semantic analyzer uses C++ declarations to build the second syntax tree, and objects to represent the various C++ declarations. All the objects support a particular 'print' method, which the code generator uses to call the root node of the second syntax tree recursively to generate the executable code. For function bodies, the semantic analyzer represents them with special closures separate from the second syntax tree. These special closures are objects with a method that prints out the execution code of the function bodies based on some function-specific parameters.

Each of the auto-checking test function is generated with the same execution flow for determining and reporting whether the procedure behaved properly or improperly. The execution flow comprises evaluation of the pre-execution conditions, evaluation of all instances of the special numeric function in the post-execution conditions, invocation of the procedure, collection of any post-execution exception conditions raised, selective evaluation of exception and normal termination post-execution conditions, and generation of reports on execution and analysis results.

BRIEF DESCRIPTION OF THE DRAWINGS

The objects, features, and advantages of the present invention will be apparent from the following detailed description of the preferred and alternate embodiments of the present invention with references to the drawings in which:

FIGS. 5a-5b show an exemplary formal specification of the present invention for an exemplary software interface.

FIGS. 7a-7b illustrate the execution flow of a generated auto-checking test function of the present invention.

FIGS. 8a-8j show an exemplary collection of generated auto-checking test functions of the present invention.

FIG. 10 shows an exemplary generated definition file of the present invention.

FIG. 11 shows an exemplary generated auxiliary function include file of the present invention.

FIGS. 12a-12b show an exemplary implementation of an exemplary user supplied auxiliary function.

DETAILED DESCRIPTION PRESENTLY PREFERRED AND ALTERNATE EMBODIMENTS

Methods and apparatus for formally specifying software interfaces and automatically generating auto-checking test functions from these formal specifications are disclosed. The methods and apparatus have particular application to automated software testing, in particular, software interfaces having a number of procedures. The procedures may be implemented in any of the well known programming languages, such as C, employing any of the well known programming methodologies, such as objected oriented programming. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
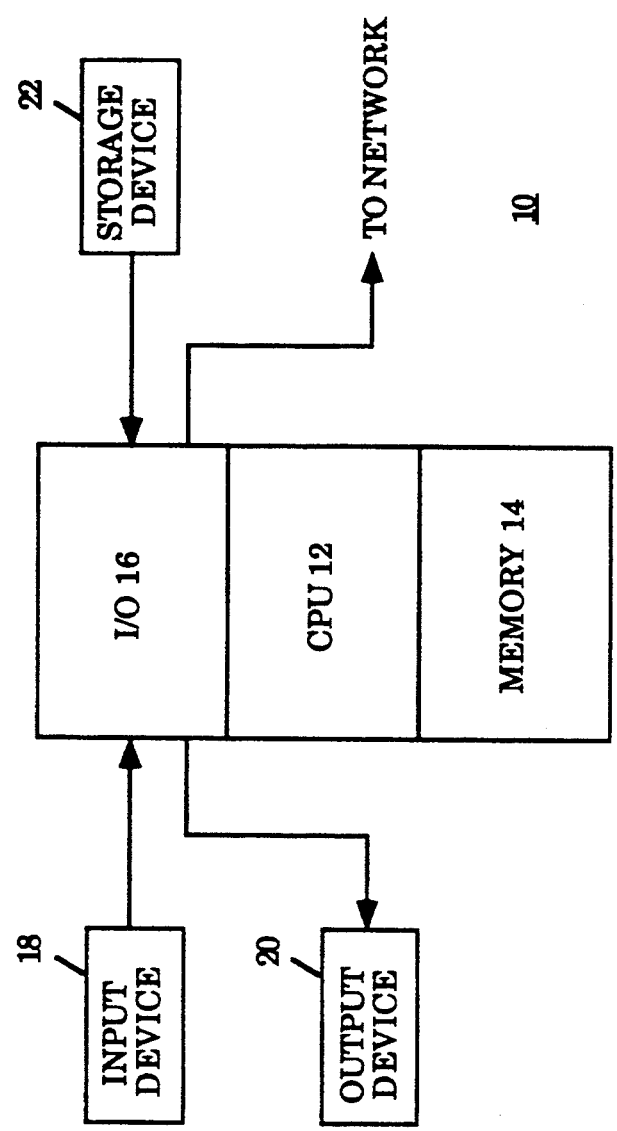
FIG. 1 shows a functional block diagram illustrating the hardware elements of an exemplary computer system that incorporates the teachings of the present invention.

Referring now to FIG. 1, a functional block diagram illustrating an exemplary computer system that incorporates the teachings of the present invention is shown. Shown is a computer 10 comprising a central processing unit (CPU) 12, a memory 14, and an I/O module 16. Additionally, the computer system 10 also comprises an input device 18, an output device 20 and a storage device 22. The CPU 12 is coupled to the memory 14 and the I/O module 16. The input device 18, the output device 20, and the storage device 22 are also coupled to the I/O module 16. The I/O module 16 in turn is coupled to a network.

Except for the manner they are used to practice the present invention, the CPU 12, the memory 14, the I/O module 16, the input device 18, the output device 20, and the storage device 22, are intended to represent a broad category of these elements found in most computer systems. Their constitutions and basic functions are well known and will not be further described here.

Figure 2:
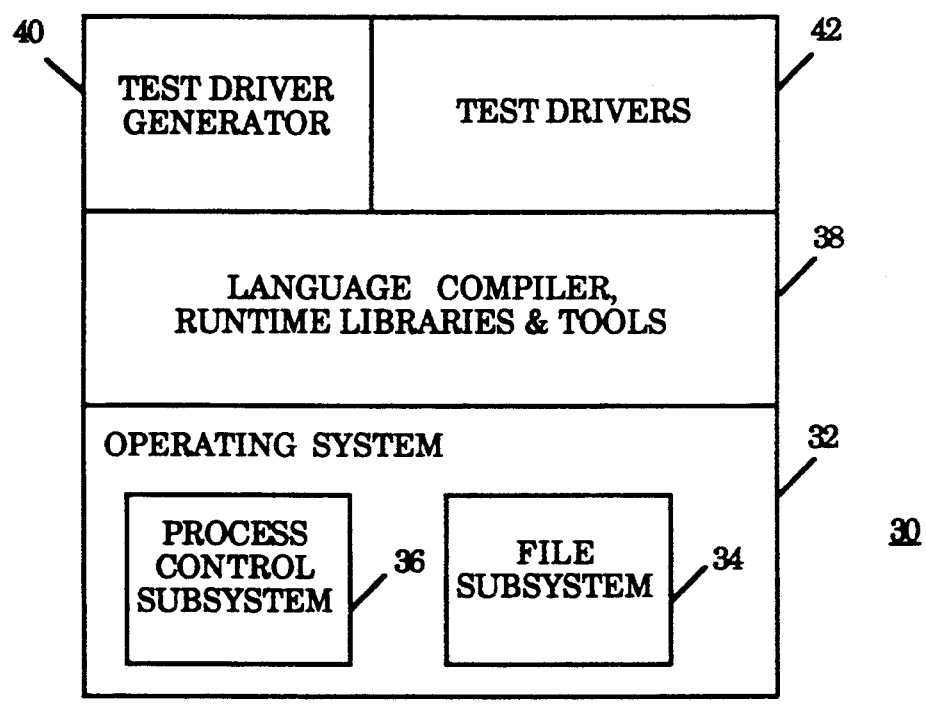
FIG. 2 shows a functional block diagram illustrating the software elements of the exemplary computer system of FIG. 1.

Referring now to FIG. 2, a functional block diagram illustrating the software elements 30 of the computer system of FIG. 1 is shown. Shown is an operating system 32 comprising a file subsystem 34 and a process control subsystem 36. The file subsystem 34 is responsible for managing files, allocating file spaces, administering free space, controlling access to files and retrieving data from files. The process control subsystem 36 is responsible for process synchronization, interprocess communication, memory management and process scheduling. The file subsystem 34 and the process control subsystem 36 are intended to represent a broad category of these elements found in most operating systems. Their constitutions and functions are well known and will not be further described here.

The software elements 30 further comprise programming language compilers, software tools/utilities and their runtime libraries 38, the auto-checking function generator of the present invention 40, and the generated auto-checking test functions of the present invention 42. The programming language compilers, software tools/utilities and their runtime libraries 38 are used to develop and execute application programs, in particular, the auto-checking test function generator 40 and the generated auto-checking test functions 42 of the present invention. The language compilers, runtime libraries, tools/utilities 38 are intended to represent a broad category of these software elements found in most computer systems. Their constitutions and functions are well known, and will not be further described here. The auto-checking test function generator and the auto-checking test functions of the present invention will be described in further detail below with references to FIGS. 6, 7, and 8a–8j.

While for ease of understanding, the present invention is being illustrated with embodiments of the auto-checking test function generator that are implemented in high-level programming languages, and auto-checking test functions that are generated in high-level programming languages, based on the descriptions to follow, it will be appreciated that the present invention may be practiced with the auto-checking test function generator and the auto-checking test functions implemented/generated in a variety of programming languages.

Figure 3:
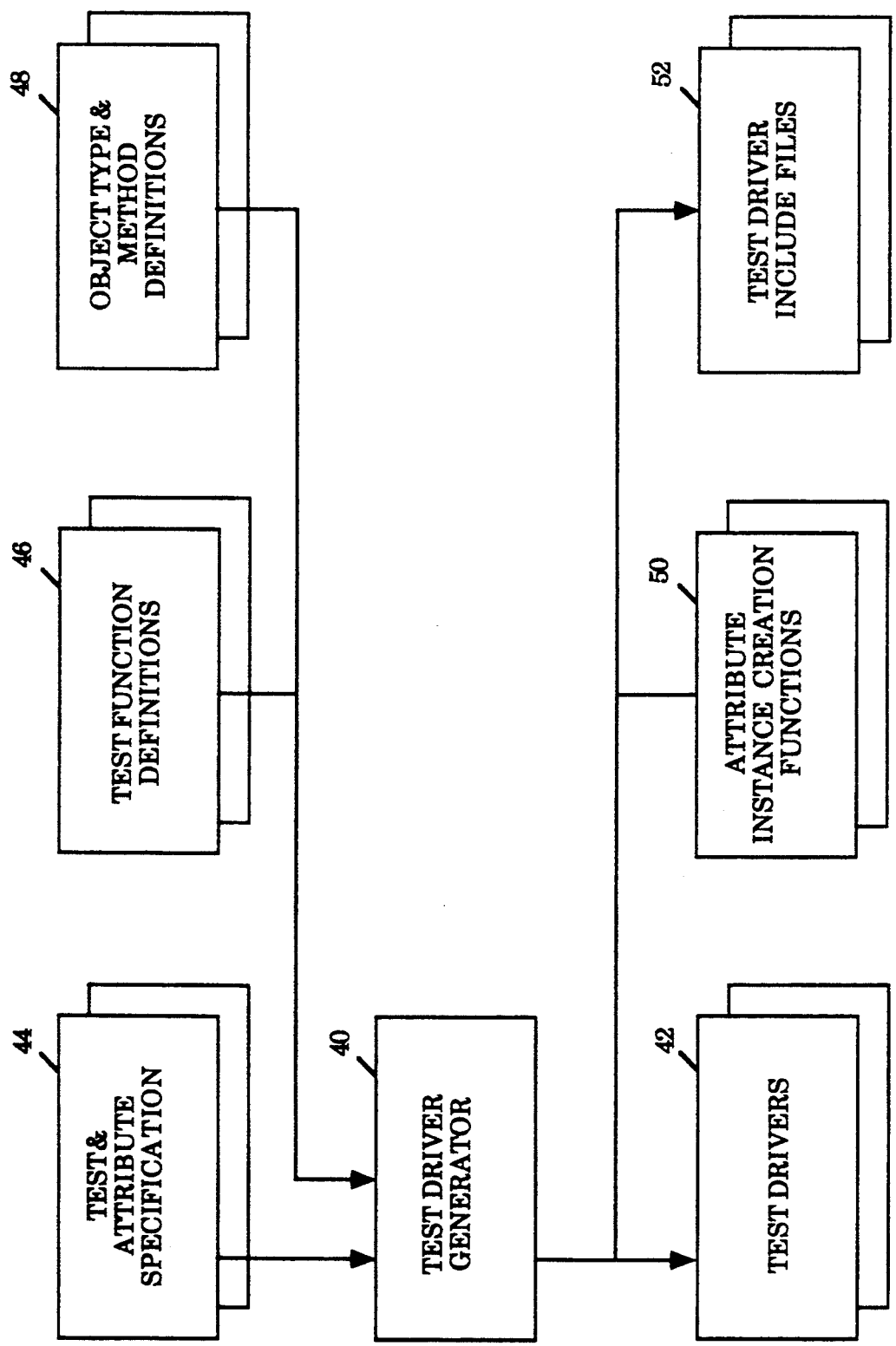
FIG. 3 shows a functional block diagram illustrating the input and output of the auto-checking test function generator of the present invention.

Referring now the FIG. 3, a functional block diagram illustrating the input and output of the auto-checking test function generator of the present invention is shown. Shown is the auto-checking test function generator 40 receiving a number of interface semantic specifications 44 as inputs. It will be appreciated that the interface semantic specifications 44 may be provided to the auto-checking test function generator 40 in a variety of manners. For examples, the interface semantic specifications 44 may be provided through an input device, or pre-stored in a storage device accessible to the auto-checking test function generator 40. The interface semantic specification will be described in further detail with references to FIGS. 4 and 5a–5b.

In response, for each interface semantic specification, the auto-checking test function generator 40 generates a number of auto-checking functions 42. In some embodiments, depending on the programming language used for the auto-checking test functions 42, and the programming methodology employed by the software interfaces, the auto-checking test function generator 40 further generates complimentary auto-checking test function include files 46, and definition files 48. It will be appreciated that preferably the auto-checking test functions 42 are generated in the programming language the procedures of the software interface are implemented. The auto-checking test function generator 42 will be described in further detail with references to FIG. 6. The auto-checking test functions will be described in further detail with references to FIGS. 7a–7b, and 8a–8j. The complimentary auto-checking test function include files 46 and definition files 46 will be described in further detail below with references to FIGS. 9 and 10 respectively.

Figure 4:
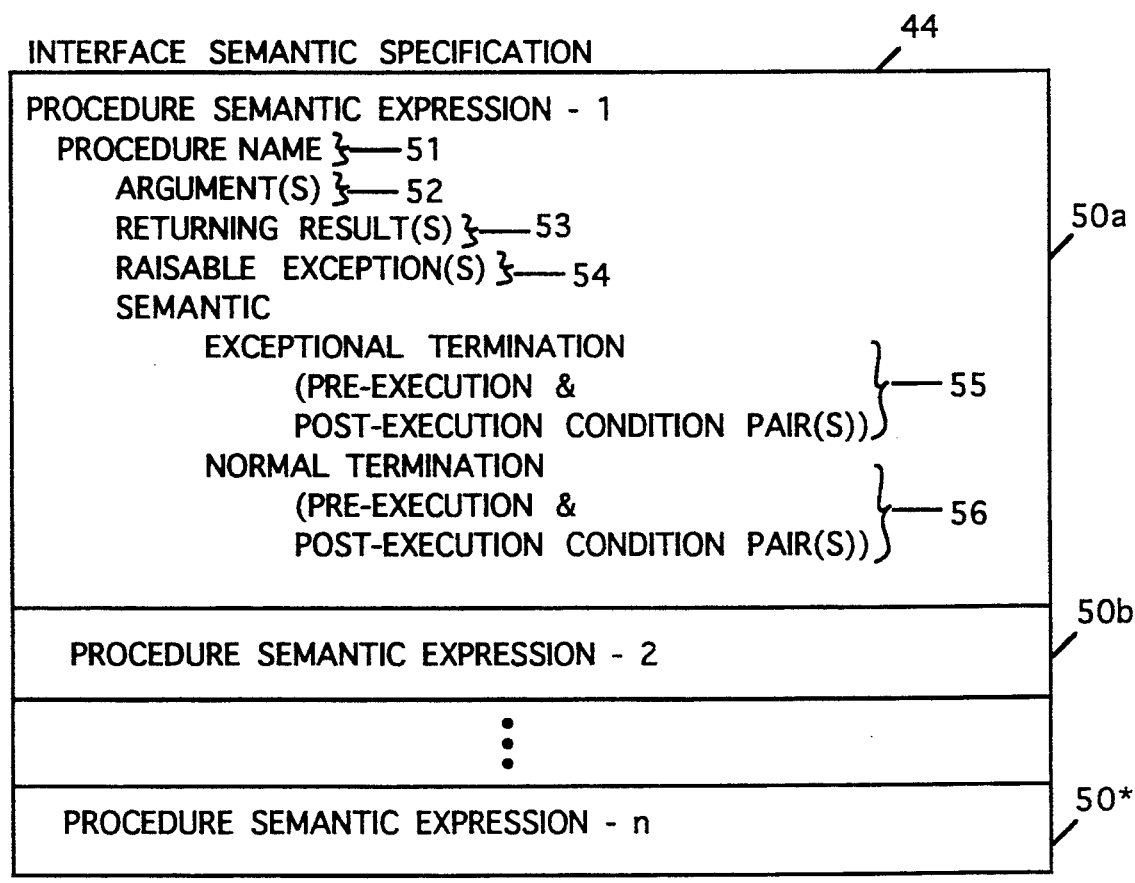
FIG. 4 illustrates the formal specification of the present invention for a software interface.

Referring now to FIG. 4, a block diagram illustrating the interface semantic specification of the present invention are shown. Shown is an interface semantic specification 44 comprising a number of procedure semantic expressions, 50a–50*, for a number of procedures of a software interface. Each procedure semantic expression, 50a, 50b , . . . , or 50*, specifies a procedure of the software interface, its pre-execution conditions and corresponding post-execution conditions. A pre-execution condition specifies a potential pre-execution state of the procedure. The corresponding post-execution condition specifies the corresponding post-execution state of the procedure if the procedure executes correctly given the pre-execution state.

In the preferred embodiment, each procedure semantic expression, 50a, 50b , . . . , or 50*, is a boolean expression comprising a procedure name, 51, its arguments 52, its returning results 52, its raisable exceptions 54, and a number of semantic clauses 55 and 56. The semantic clauses 55 and 56 comprise exceptional termination clauses 55, each comprising a pre-execution and post-execution condition pair for an exceptional termination state, and normal termination clauses 56, each comprising a pre-execution and post-execution condition pair for a normal termination state.

Each boolean expression, 50a, 50b , . . . , or 50*, is constructed using boolean and comparison operators, call to the procedure, auxiliary and special functions. The auxiliary functions are user supplied functions. The special functions comprise a special boolean function, and a special temporal function. The special boolean function has an exception post-execution condition as its argument, and returns a true value when a procedure raises the particular exception during execution. The special temporal function has variable names as its arguments, and returns their pre-execution values after a procedure was invoked.

Additionally, the interface semantic specification 44 may allow raisable exceptions be declared globally and shared among the procedure semantic expressions, 50a–50*. The interface semantic specification 44 may also allow the specification of exceptional and normal terminations be defaulted, and/or the pre-execution and post-execution condition pairs be specified as invariant conditions. An invariant condition is a condition that always hold, both before and after execution of the procedure.

Furthermore, for an object oriented software interface, the interface semantic specification 44 may allow specification of object inheritance characteristics and references to locally defined objects in the procedure semantic expressions. Preferably, the locally defined objects are specified with object semantic expressions in like manner as the procedure semantic expressions.

Referring now to FIGS. 5a–5b diagrams showing an exemplary interface semantic specification are shown. Shown is an exemplary interface semantic specification 44' for an object oriented interface "am" comprising four exemplary procedure semantic expressions, 50a'–50d', specifying the semantics for four exemplary procedures, "createaccount", "deposit", "withdraw", and "getbalance", in C like syntax.

Each exemplary procedure semantic expression, 50a', 50b', 50c', or 50d', specifies the procedure, its pre-execution conditions and the corresponding post-execution conditions. Each exemplary procedure semantic expression, 50a', 50b', 50c' or 50d', is a boolean expression constructed with boolean and comparison operators, calls to the procedure, an exemplary locally defined object "owns", an exemplary special boolean function "raises", and an exemplary special temporal function "prev".

The exemplary "createaccount" semantic expression 50a' specifies the exemplary procedure name to be "createaccount" 51a', the procedure argument to be "openingbalance: copy amount" 52a', the returning result to be "newaccount: account" 53a', the raisable exception to be "negativeamount" 54a', one exceptional termination 55a' and one normal termination 56a'. The exemplary "deposit" semantic expression 50b' specifies the exemplary procedure to be "deposit" 51b', the procedure argument to be "depositamount: copyamount" 52b', the raisable exception to be "negativeamount" 54b', one exceptional termination 55b' and one normal termination 56b'. The exemplary "withdraw" semantic expression 50c' specifies the exemplary procedure to be "withdraw" 51c', the procedure argument to be "withamount: copyamount" 52c', the raisable exceptions to be "negativeamount" and "insufficient fund"54c', two exceptional terminations 55c' and one normal termination 56c'. The exemplary "getbalance" semantic expression 50d' specifies the exemplary procedure to be "getbalance" 51d', the procedure argument to be null, the returning value to be "balance: amount" 53d', the raisable exception to be null, the exceptional and normal terminations to be defaulted. The "negativeamount" and "insufficient funds" exceptions are globally defined 57' and shared by the exemplary procedures 50a'–50d'.

Additionally, the exemplary interface semantic specification 44' specifies that the object oriented interface "am" is to inherit "generic object" from interface "misc.genericobject" 59', and the object semantic for the exemplary object "own" 58a' to be a returning boolean value.

While the interface semantic specification is being illustrated herein with an object oriented software interface, it will be appreciated that the present invention may be practiced with non-object oriented interface semantic specifications for non-object oriented software interfaces.

Figure 6:
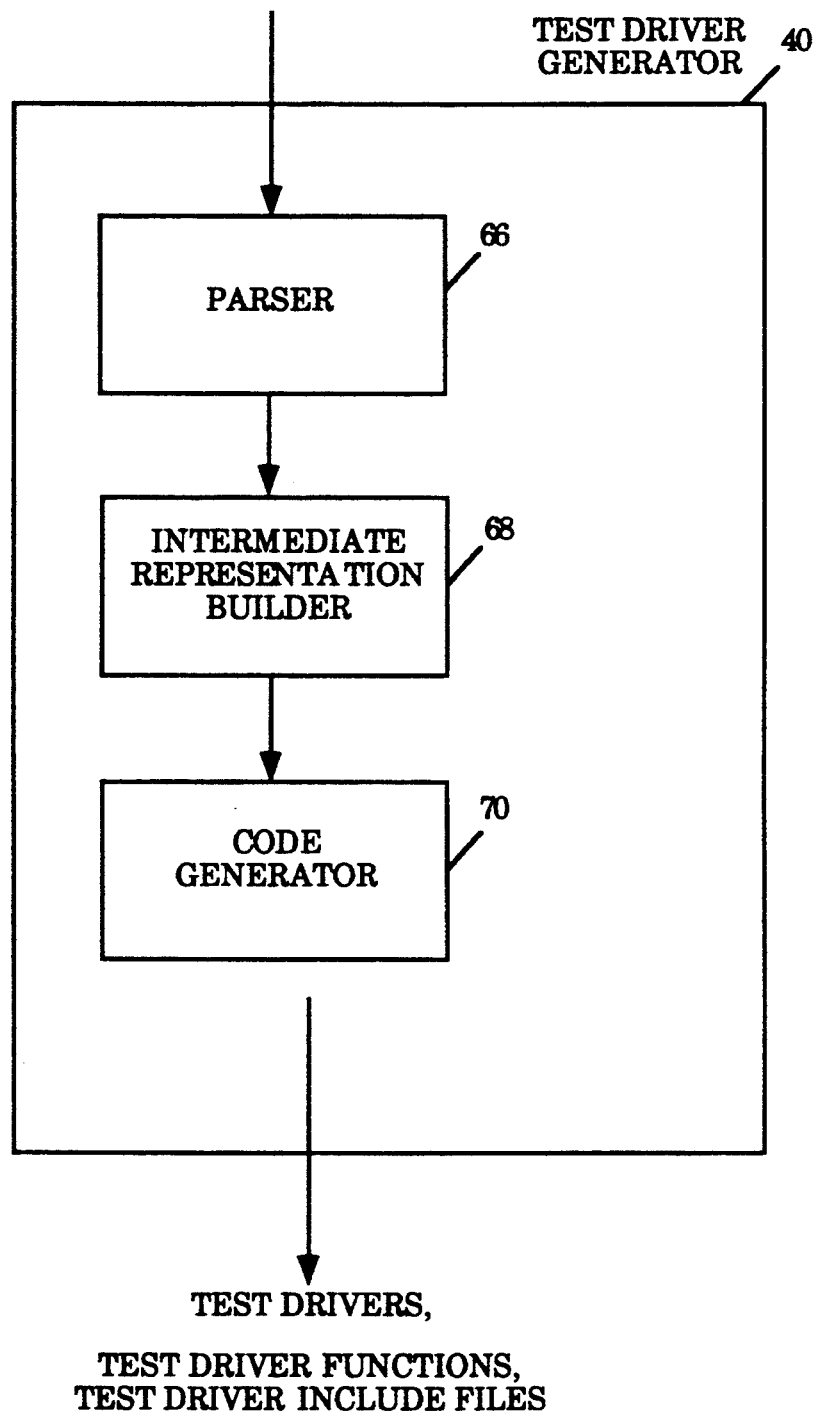
FIG. 6 shows a function block diagram illustrating one embodiment of the auto-checking test function generator of the present invention.

Referring now to FIG. 6, a functional block diagram illustrating one embodiment of the auto-checking function generator of the present invention of the present invention is shown. Shown is the auto-checking function generator 40 comprising a parser 60, an intermediate representation builder 62, a semantic analyzer 64, and a code generator 66. These elements are sequentially coupled to each other. Together, they generate the auto-checking test functions and the related outputs of the present invention in C and C like syntaxes respectively for object oriented interfaces whose procedures are implemented in a programming language that supports inter-program call from a C program, in response to received interface semantic specifications using C like syntaxes.

The parser 60, the intermediate representation builder 62, the semantic analyzer 64, and the code generator 66, are implemented in like manners similar to a broad category of equivalent elements found in many well known programming language compilers. Their constitutions, basic functions offered, and operation flows will only be briefly described here.

The parser 60 receives the interface semantic specifications as inputs, and tokenizes the boolean expressions. The intermediate representation builder 62 receives the tokenized boolean expressions as inputs, and generates intermediate representations for these boolean expressions. The semantic analyzer 64 receives the intermediate representations as inputs, analyzes the semantics, and restructures the intermediate representations for output generation. The code generator 66 receives the restructured intermediate representations as inputs, and generates executable code for the auto-checking test functions.

In this particular embodiment, the parser 60 parses and tokenizes the boolean expressions based on a YACC grammar. The intermediate representation builder 62 builds an annotated syntax tree. The semantic analyzer 64 analyzes and restructures the annotated syntax tree into a second syntax tree. The code generator 66 generates the executable code of the auto-checking test functions using the second syntax tree.

Additionally, the intermediate representation builder 62 uses C++ objects to represent the various grammar constructs in the annotated syntax tree. Except for the function bodies, the semantic analyzer 64 uses C++ declarations to build the second syntax tree, and objects to represent the various C++ declarations. All the objects support a particular "print" method, which the code generator uses to call the root node of the second syntax tree recursively to generate the executable code. For function bodies, the semantic analyzer 64 represents them with special closures separate from the second syntax tree. Each of these special closures is an object with a method that prints out the execution code of the function body based on some function-specific parameters.

For further descriptions on various parsers, intermediate representation builders, semantic analyzers, code generators, annotated and restructured syntax trees, and closures, see A. V. Aho, R. Sethi, and J. D. Ullman, *Compilers Principles, Techniques and Tools*, Addison-Wesley, 1986, pp. 25–388, and 463–512.

It will be appreciated that the auto-checking function generator of the present invention may be practiced with other embodiments having elements providing equivalent functions provided by the elements of the above embodiment. It will further be appreciated that these other embodiments may generate auto-checking test functions in programming languages other than C, related outputs in syntaxes other than being C like, in response to formal specifications in syntaxes also other than being C like, and/or for software interfaces that are non-object oriented.

Figure 7B:
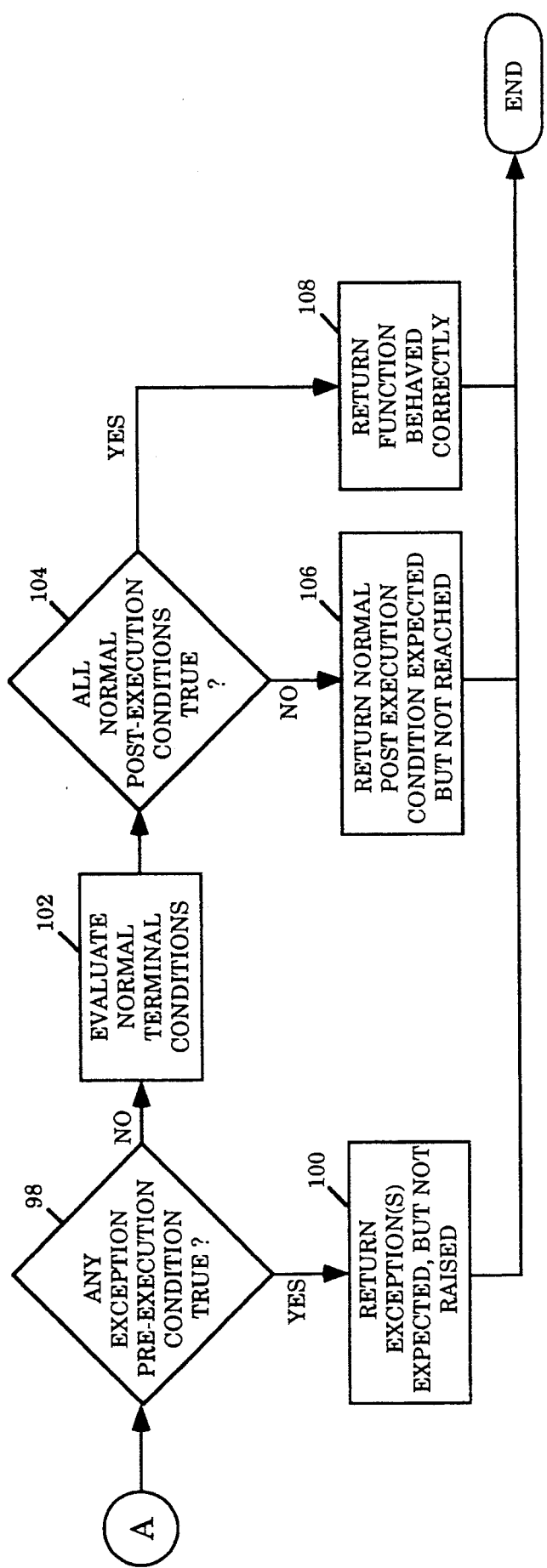

Referring now to FIGS. 7a–7b, two block diagrams illustrating the execution flow of the generated auto-checking test functions of the present invention is shown. Shown in FIGS. 7a–7b is the identical execution flow 70 for each generated auto-checking test function. FIG. 7a illustrates the initial execution steps, blocks 72–78, and the post-execution analysis steps, blocks 82–96 if at least one exception is raised as a result of the execution. FIG. 7b illustrates the post-execution analysis steps, blocks 98–108, if no exception is raised as a result of the execution.

As shown in FIG. 7a, Initially, the pre-execution conditions, and each instances of the special temporal function, are evaluated, blocks 72 and 74. A boolean variable reflecting expectation of the raising of exceptions is set to "False", block 76. The procedure being tested by the generated auto-checking test function is then called, block 78.

Upon returning from the procedure at the end of its execution, the returned results are checked to determine if any exceptions are raised as a result of the execution, block 80. If one or more exceptions are raised, a number of post-execution analysis steps, blocks 82-96, are selectively performed for each of the exception raised. If no exception is raised, a different number of post-execution analysis steps, blocks 98-108, are selectively performed.

If one or more exceptions are raised, for each exception raised, the pre-execution condition for the exception is checked to determine if it is true, block 82. If the pre-execution condition for the raised exception is not true, an execution result of incorrectly raising an unexpected exception is reported, block 84. If the pre-execution condition is true, the exception expectation boolean variable is set to "True", block 86. The exception post-execution condition is evaluated and checked to determine if it is true, blocks 88 and 90. If the exception post-execution condition is not true, an execution result of correct expectation of exception, but incorrect post-execution condition is reported, block 92. If the exception post-execution condition is true, an execution result of correct behavior is reported, block 94. After blocks 84, 92 and 94, a determination is made whether all exceptions raised have been analyzed, block 96. If more exceptions are still to be analyzed, blocks 82-94 are repeated. If all exceptions raised have been analyzed, execution ends.

As shown in FIG. 7b, if no exception post-execution condition is raised, the pre-execution condition of the raisable exceptions are evaluated and checked to determine if any of them are true, block 98. If at least one of the pre-execution condition of the raisable exception is true, an execution result of failing to raise an expected exception is reported, block 100. If none of the pre-execution condition of the raisable exceptions are true, the normal post-execution conditions are evaluated, and checked to determine if they are all true, blocks 102 and 104. If at least one of the normal post-execution condition is not true, an execution result of failing to reach expected normal post-execution condition is reported, block 106. If all the normal post-execution conditions are true, an execution result of correct behavior is reported, block 108. After blocks 100, 106, or 108, execution ends.

Figure 8C:
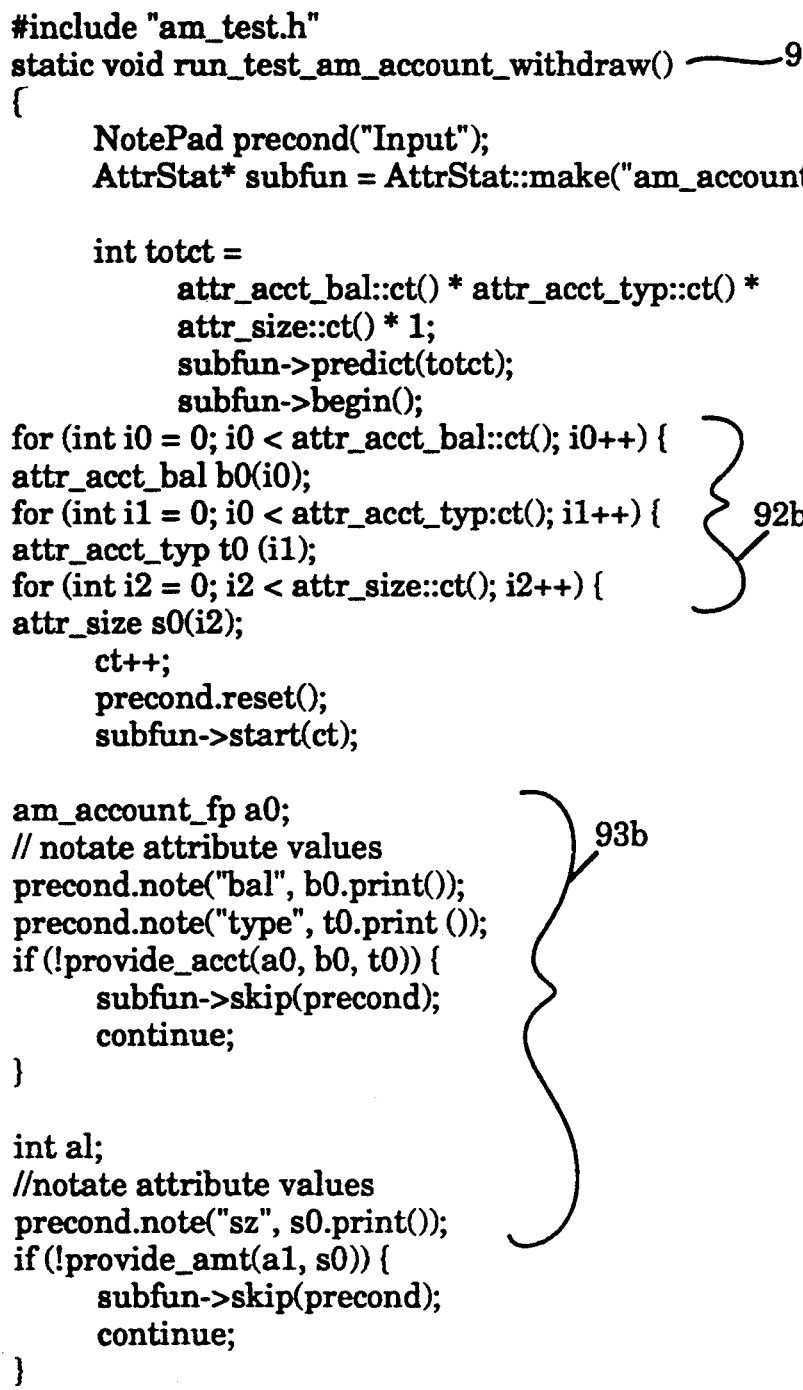

Referring now to FIGS. 8a-8j, ten diagrams showing an exemplary collection of generated auto-checking test functions are shown. Shown is an exemplary collection of auto-checking test functions generated for the exemplary interface semantic specification "am" of FIGS. 5a-5b. As shown in FIG. 8a, the exemplary collection of generated auto-checking test functions comprises an exemplary include statement including the exemplary auto-checking test function include file "amtest.h", 110, and a number of statistic variables, 112, generated for reporting purposes. The exemplary collection of auto-checking test functions are generated in C. The auto-checking test function include file will be described in further detail later with references to FIG. 9.

As illustrated in FIGS. 8b-8j, the exemplary collection of auto-checking test functions further comprises four exemplary auto-checking test functions, "testamcreateaccount", 114a and 114b, "testamaccountdeposit", 116a and 116b, "testamaccountwithdraw", 118a and 118b, "testamaccountgetbalance", 120, one for each of the exemplary procedures specified in the exemplary interface semantic specification "am". Each of the exemplary auto-checking test functions generated, 114a and 114b, 116a and 116b, 118a and 118b, or 120, has an execution flow as described earlier.

Figure 9A:
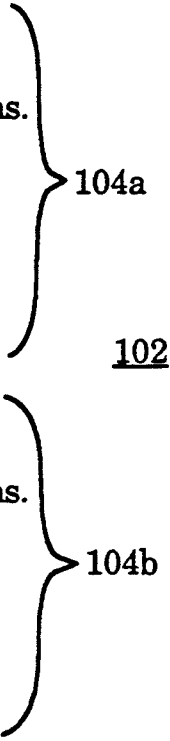
FIG. 9 shows an exemplary generated auto-checking test function include file of the present invention.

Referring now to FIGS. 9-11, three diagrams illustrating the generated auto-checking test function include file, definition file, and auxiliary function include file of the present invention are shown. Shown are the exemplary auto-checking test function include file, the exemplary definition file, and the exemplary auxiliary function include file generated for the exemplary collection of auto-checking functions of FIGS. 8a-8j, based on the exemplary interface semantic specification "am" of FIGS. 5a-5b.

The auto-checking test function include file is used to define other common include files and the generated auto-checking test functions. An exemplary use of the auto-checking test function include file is inclusion in a test driver that selectively invokes the generated test functions with selected combinations of attribute values for the test functions' parameter attributes. Whether a particular embodiment of the auto-checking test function generator generates auto-checking test function include files is dependent on the programming language used for the auto-checking test functions. For further description of test drivers, see related U.S. patent application, Ser. No. 07,906,692, entitled Automatic Generation of Test Drivers.

As shown in FIG. 9, the exemplary auto-checking test function include file 122 generated for the exemplary procedures specified in the exemplary interface semantic specification "am" of FIGS. 5a-5b comprises a number of exemplary include statements 124, and the names for each of the exemplary auto-checking test functions generated, 126, i.e. "testamcreateaccount", "testamaccountdeposit", "testamaccountwithdraw", and "testamaccountgetbalance".

The definition file is used to define object types, inheritance characteristics, and methods for the objects involved. It may be used for other definitional purposes. An exemplary use of the definition file is to enable type checking in an automatic test driver generator. Similarly, whether a particular embodiment of the auto-checking test function generator generates definition files is dependent on the programming methodologies supported for the procedures being tested.

As shown in FIG. 10, the exemplary definition file 128 generated for the exemplary interface semantic specification "am" comprises a number of object type definitions 130, one inheritance definition 132, and a number of method definitions 134.

The auxiliary function include file is used to define auxiliary functions and other include files used in defining the auxiliary function. An exemplary use of the auxiliary function include file is inclusion in a test driver that selectively invokes the generated test functions with selected combinations of attribute values for the test functions' parameter attributes. Whether a particular embodiment of the auto-checking test function generator generates auxiliary function include files is dependent on whether a user uses auxiliary functions in specifying a software interface and the programming languages used in implementing the test drivers and the auxiliary functions.

As shown in FIG. 11, the exemplary auxiliary function include file 136 generated for the exemplary procedures specified in the exemplary interface semantic specification "am" of FIGS. 5a–5b comprise a definition for the exemplary local object "owns" 140, and other include file names 138 used in conjunction to defined the exemplary local object "owns".

Referring now to FIGS. 12a–12b, two block diagrams illustrating an exemplary implementation of an user supplied auxiliary function are shown. Shown is the exemplary implementation of an user supplied auxiliary function in C for the locally defined object "owns" used in the formal interface specification of FIGS. 5a–5b. FIG. 12a illustrates the exemplary auxiliary function 142, and FIG. 12b illustrates the exemplary complementary include file 148 for the exemplary auxiliary function.

The exemplary auxiliary function 142 returns a boolean value "true" if the object named in its arguments owns the "account" named in its arguments, 144. The exemplary determination involves the use of an exemplary "amaccountbranch" function 146 for determining which "bank" holds the "account". The exemplary complementary include file 148 comprises two exemplary object class definitions 150–152, one for an exemplary object class "amimpl", and another the an exemplary object class "amaccountimpl".

While the present invention has been described in terms of presently preferred and alternate embodiments, those skilled in the art will recognize that the invention is not limited to the embodiments described. The methods and apparatus of the present invention can be practiced with modification and alteration within the spirit and scope of the appended claims. The description is thus to be regarded as illustrative instead of limiting on the present invention.

What is claimed is:

1. In a computer system comprising a software component, wherein said software component comprises a procedure, and an interface for invoking said procedure, a method for generating an auto-checking test function for said procedure, said method comprising the steps of:
   (a) identifying and specifying said procedure using a plurality of procedure semantic expressions, each of said procedure semantic expressions being constructed using selected ones of comparison operators, Boolean operators, calls to said procedure, auxiliary and special functions, said auxiliary functions being user supplied, and said computer system further having
   i) a special Boolean function having an exception specified as its argument, said special Boolean function returning an affirmative value when its argument is raised after execution of said procedure; and
   ii) a special temporal function having at least one variable name as its argument, said special temporal function returning a pre-execution value for each of said at least one variable name after execution of said procedure; and
   (b) generating said auto-checking test function based on said identification and specification made using said plurality of procedure semantic expressions.

2. The method as set forth in claim 1, wherein, said generated auto-checking test function in said step b) comprises a plurality of execution steps, said execution steps comprising:
   i) evaluating and recording pre-execution state of said procedure;
   ii) evaluating and recording pre-execution values for selected variables of said procedure, said selected variables being variables required subsequently to determine whether the correct corresponding termination state is reached from said recorded pre-execution state;
   iii) executing said procedure;
   iv) determining whether any exceptions were raised during said execution;
   v) determining whether each raised exception is expected if at least one exception was raised during said execution;
   vi) determining whether each corresponding correct exception termination state is reached if at least one raised exception is expected;
   vii) determining whether any exceptions are expected if no exception was raised during said execution;
   viii) determining whether each correct normal termination state is reached if no exception was raised nor expected during said execution.

3. The method as set forth in claim 2, wherein, said step b) comprises:
   b.1) parsing and tokenizing said procedure semantic expression using a YACC grammar;
   b.2) generating intermediate representation for said tokenized procedure semantic expression, said intermediate representation being a syntax tree;
   b.3) analyzing and restructuring said generated intermediate representation, said restructured intermediate representation being an annotated syntax tree; and
   b.4) generating executable code for said auto-checking test function using said restructured intermediate representation.

4. The method as set forth in claim 3, wherein, said step b) further comprises the step of b.5) generating include files for said generated auto-checking test function.

5. The method as set forth in claim 2, wherein, said step (a) comprises the steps of:
   a.1) identifying said procedure;
   a.2) specifying each invoking argument of said identified procedure if said identified procedure has invoking arguments;
   a.3) specifying each returning result of said identified procedure if said identified procedure has returning results;
   a.4) specifying each raisable exception of said identified procedure if said identified procedure has raisable exceptions;
   a.5) specifying each exceptional termination of said identified procedure if said identified procedure has exceptional terminations, each specified exception termination identifying a correct exception termination state for said identified procedure given a particular pre-execution state;
   a.6) specifying each normal termination for said identified procedure, each specified normal termination identifying a correct normal termination state for said identified procedure given a particular pre-execution state.

6. The method as set forth in claim 5, wherein, said software component comprises a plurality of objects, wherein at least one object upon which said identified procedure is invocable, said interface being objected oriented;

said method further comprises the step of a.7) specifying each inheritance characteristic of said at least one object if said at least one object inherits from other objects, said step a.7) being performed before said step b), and said step b) being performed based also on said specification in step a.7).

7. The method as set forth in claim 6, wherein,
said locally defined objects are defined with object semantic expressions in like manner as said procedure being defined with said procedure semantic expressions.

8. The method as set forth in claim 7, wherein, said step b) comprises,
  b.1) parsing and tokenizing said procedure and object semantic expressions using a YACC grammar;
  b.2) generating intermediate representation for said tokenized procedure and object semantic expressions, said intermediate representation being a syntax tree;
  b.3) analyzing and restructuring said generated intermediate representation, said restructured intermediate representation being an annotated syntax tree; and
  b.4) generating executable code for said auto-checking test function using said restructured intermediate representation.

9. The method as set forth in claim 8, wherein,
grammar constructs in said annotated syntax tree in said step b.3) are represented by C++ objects;
grammar constructs other than function bodies are represented in said restructured syntax tree with C++ declarations which are represented by objects, each of said objects representing one of said C++ declarations supporting a print method, said print method being used to call a root node of said restructured syntax tree recursively to generate said executable code; and
function bodies are represented by special closures separate from said restructured syntax tree in said step b.3), each of said special closures being an object having a print method for printing out executable code of the function body based on function specific parameters.

10. The method as set forth in claim 8, wherein, said step b) further comprises the step of b.5) generating definition files for said generated auto-checking test function, said definition files comprising object type definitions of said objects, inheritance characteristics of said defined object types, and methods of said object types.

11. In a computer system comprising a software component, wherein said software component comprises a procedure, and an interface for invoking said procedure, an apparatus for generating an auto-checking test function for said procedure, said apparatus comprising:
  a) receiving means for receiving identification and specifications of said procedure, said identification and specifications being made using a plurality of procedure semantic expressions, each of said procedure semantic expressions being constructed using selected ones of comparison operators, Boolean operators, calls to said procedure, auxiliary functions, and special functions, said auxiliary functions being user supplied, and said computer system further having i) a special Boolean function having an exception specified as its argument, said special Boolean function returning an affirmative value when its argument is raised after execution of said procedure, and
  j) a special temporal function having at least one variable name as its argument, said special temporal function returning a pre-execution value for each of said at least one variable name after execution of said procedure;
  b) auto-checking test function generator means coupled to said receiving means for generating said auto-checking test function based on said received identification and specifications.

12. The apparatus as set forth in claim 11, wherein, said generated auto-checking test function comprises a plurality of execution steps, said execution steps comprising:
  i) evaluating and recording pre-execution state of said procedure;
  ii) evaluating and recording pre-execution values for selected variables of said procedure, said selected variables being variables required subsequently to determine whether the correct corresponding termination state is reached from said recorded pre-execution state;
  iii) executing said procedure;
  iv) determining whether any exceptions were raised during said execution;
  v) determining whether each raised exception is expected if at least one exception was raised during said execution;
  vi) determining whether each corresponding correct exception termination state is reached if at least one raised exception is expected;
  vii) determining whether any exceptions are expected if no exception was raised during said execution;
  viii) determining whether each correct normal termination state is reached if no exception was raised nor expected during said execution.

13. The apparatus as set forth in claim 11, wherein, said first generating means comprises:
  b.1) parser and tokenizer means coupled to said receiving means for parsing and tokenizing said procedure semantic expression using a YACC grammar;
  b.2) intermediate representation generator means coupled to said parser and tokenizer means for generating intermediate representation for said tokenized procedure semantic expression, said intermediate representation being a syntax tree;
  b.3) analyzer means coupled to said intermediate representation generator means for analyzing and restructing said generated intermediate representation, said restructed intermediate representation being an annotated syntax tree; and
  b.4) code generator means coupled to said analyzer means for generating executable code for said auto-checking test function using said restructured intermediate representation.

14. The apparatus as set forth in claim 13, wherein, said code generator means further generates include files for said generated auto-checking test function.

15. The method as set forth in claim 11, wherein said said identification and specifications comprise:
  i) identification of said procedure;

ii) specification of each invoking argument of said identified procedure if said identified procedure has invoking arguments;

iii) specification of each returning result of said identified procedure if said identified procedure has returning results;

iv) specification of each raisable exception of said identified procedure if said identified procedure has raisable exceptions;

v) specification of each exceptional termination of said identified procedure if said identified procedure has exceptional terminations, each specified exception termination identifying a correct exception termination state for said identified procedure given a particular pre-execution state; and vi) specification of each normal termination for said identified procedure, each specified normal termination identifying a correct normal termination state for said identified procedure given a particular pre-execution state.

16. The apparatus as set forth in claim 15, wherein, said software component comprises a plurality of objects, wherein at least one object upon which said identified procedure is invocable, said interface being objected oriented;

said identification and specifications further comprise specification of each inheritance characteristic of said at least one object if said at least one object inherits from other objects, said auto-checking test function being generated based also on said inheritance specification.

17. The apparatus as set forth in claim 16, wherein, said locally defined objects are defined with object semantic expressions in like manner as said procedure being defined with said procedure semantic expressions.

18. The apparatus as set forth in claim 17, wherein, said auto-checking test function generator means comprises, b.1) parser and tokenizer means coupled to said receiving means for parsing and tokenizing said procedure and object semantic expressions using a YACC grammar;

b.2) intermediate representation means coupled to said parser and tokenizer means for generating intermediate representation for said tokenized procedure and object semantic expressions, said intermediate representation being a syntax tree;

b.3) analyzer means coupled to said intermediate representation means for analyzing and restructuring said generated intermediate representation, said restructured intermediate representation being an annotated syntax tree; and b.4) code generation means coupled to said analyzer means for generating executable code for said auto-checking test function using said restructured intermediate representation.

19. The apparatus as set forth in claim 18, wherein, grammar constructs in said annotated syntax tree are represented by C++ objects;

grammar constructs other than function bodies are represented in said restructured syntax tree with C++ declarations which are represented by objects, each of said objects representing one of said C++ declarations supporting a print apparatus, said print apparatus being used to call a root node of said restructured syntax tree recursively to generate said executable code; and function bodies are represented by special closures separate from said restructured syntax tree, each of said special closures being an object having a print apparatus for printing out executable code of the function body based on function specific parameters.

20. The apparatus as set forth in claim 17, wherein, said code generator means further generates definition files for said generated auto-checking test function, said definition files comprising object type definitions of said objects, inheritance characteristics of said defined object types, and methods of said object types.

* * * * *

UNITED STATES PATENT AND TRADEMARK OFFICE
CERTIFICATE OF CORRECTION

PATENT NO. : 5,357,452
DATED : October 18, 1994
INVENTOR(S) : Pio-di-Savoia et al.

It is certified that error appears in the above-identified patent and that said Letters Patent is hereby corrected as shown below:

In column 12, claim 5 at line 65, please insert the following -- said identification and specification in said steps (a.1) through (a.6) being made using said procedure semantic expressions --

In column 14, claim 11 at line 6, please delete " (j) " and insert -- (ii) --.

Signed and Sealed this

Twenty-seventh Day of April, 1999

Attest:

Q. TODD DICKINSON

*Attesting Officer*    *Acting Commissioner of Patents and Trademarks*